July 20, 1948.  J. H. WEBSTER  2,445,413
CLEAR VISION WINDSHIELD DE-ICER
Filed Aug. 21, 1944  2 Sheets-Sheet 1
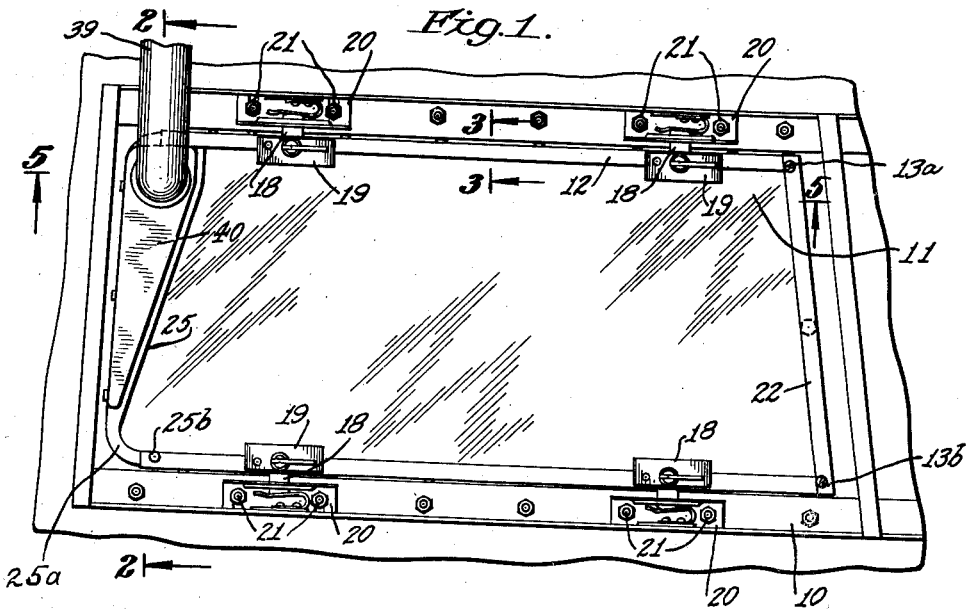
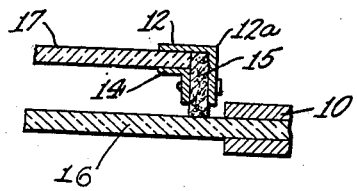
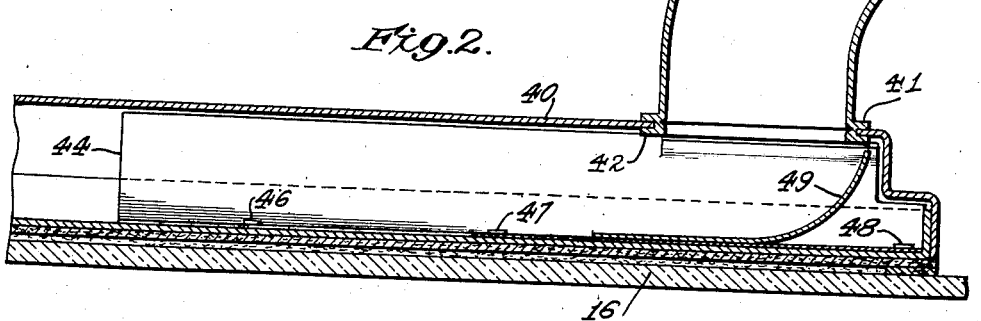
INVENTOR.
JOHN HAROLD WEBSTER
BY
H. G. Manning
ATTORNEY

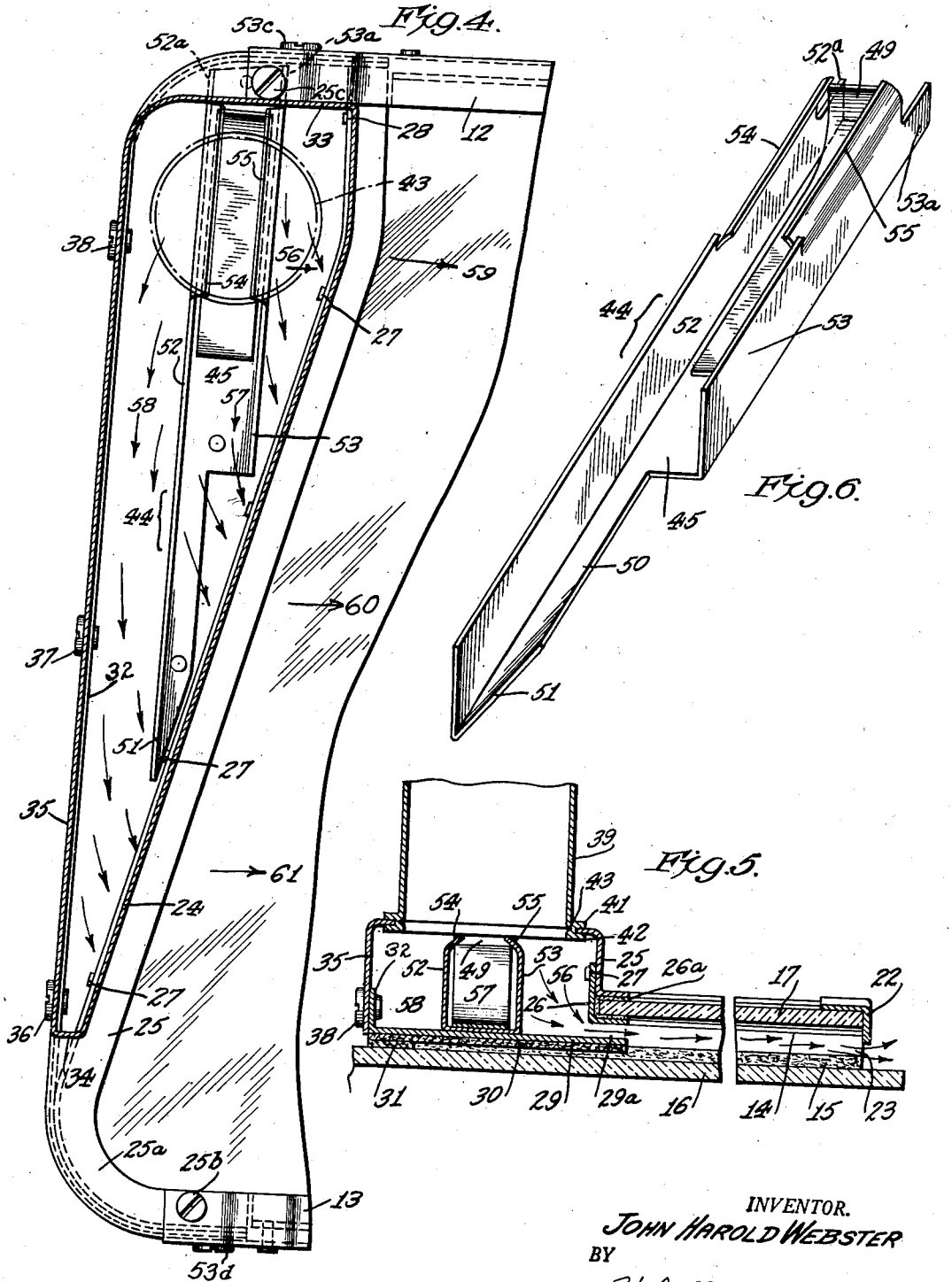
July 20, 1948.　　　　J. H. WEBSTER　　　　2,445,413
CLEAR VISION WINDSHIELD DE-ICER
Filed Aug. 21, 1944　　　　　　　　　　　　2 Sheets-Sheet 2
INVENTOR.
JOHN HAROLD WEBSTER
BY
H. G. Manning
ATTORNEY Patented July 20, 1948

2,445,413

UNITED STATES PATENT OFFICE 2,445,413

CLEAR VISION WINDSHIELD DEICER

John Harold Webster, Rocky Hill, Conn., assignor to The Stanley Works, New Britain, Conn., a corporation of Connecticut Application August 21, 1944, Serial No. 550,474

5 Claims. (Cl. 20—40.5)

This invention relates to improvements in a de-icer panel for an airplane windshield in order to provide maximum visibility, clear vision, and a uniform distribution of the hot air passing through said panel, which is located in front of the pilot's position.

One object of the present invention is to provide a de-icer panel of the above nature, having a wedge-shaped air intake distributor shell at the side of the panel which will afford the minimum of interference with the forward vision of the pilot.

Another object is to provide a de-icer panel of the above nature in which the distributor shell will have an inclined side edge which is furnished with an elongated slot through which hot air is delivered into said panel.

A further object is to provide a de-icer panel distributor shell of the above nature within which is located a U-shaped baffle which is adapted to guide the hot air so that it will pass out of the manifold slot in three streams which flow directly through the panel, thus maintaining uniform de-icing conditions throughout the length of said panel.

A still further object is to provide a de-icer panel of the above nature which will be simple in construction, inexpensive to manufacture, easy to install and manipulate, compact, ornamental in appearance, and very efficient and durable in use.

With these and other objects in view, there has been illustrated on the accompanying drawings one form in which the invention may conveniently be embodied in practice.

In the drawings,

Fig. 1 represents a rear view of the improved de-icer panel as it appears when installed upon the inside of an airplane windshield in front of the position of the pilot.

Fig. 2 is a transverse sectional view of the same, taken along the line 2—2 of Fig. 1, looking in the direction of the arrows, and illustrating the construction of the hot air inlet pipe, the distributing shell, and the interior baffle.

Fig. 3 is a transverse sectional detail view, taken along the line 3—3 of Fig. 1, and showing the construction of the felt sealing strip carried by the de-icer panel and engaging the rear surface of the windshield pane.

Fig. 4 is a rear sectional view of the de-icer, distributor shell with the top removed to show the interior baffle.

Fig. 5 is a longitudinal sectional view of the distributor shell and de-icer panel, taken along the line 5—5 of Fig. 1.

Fig. 6 is a perspective view of the U-shaped air baffle shown by itself.

Referring now to the drawings in which like reference numerals denote corresponding parts throughout the several views, the numeral 10 indicates a windshield frame of substantially rectangular shape, located in front of the pilot's position in an airplane.

In order to prevent the deposit and accumulation of sleet, snow or ice upon the transparent pane at the front of the windshield, which might obstruct the pilot's vision, provision is made of a detachable de-icer panel 11 including horizontal top and bottom rails 12, 13, which rails are connected together by a substantially vertical right-hand rail 22, and an inclined left-hand rail 25 which is S-shaped in cross section. Each of the horizontal rails 12, 13 is constructed of an outer angle bar 12a and an inner angle bar 14 having a felt sealing strip 15 clamped therebetween, as shown in Fig. 3.

The horizontal rails 12, 13 are adapted to be connected to the right-hand rail 22 by means of corner screws 13a, 13b, while the bottom of the left-hand rail 25 is connected to the bottom rail 13 by a screw 25b, as described later.

The hot air for de-icing the windshield is designed to pass between a pair of transparent panes 16, 17 of said windshield and the panel 11 respectively, said panes 16, 17 being constructed of any suitable material such as glass or molded plastic. The temperature at which the hot air is supplied for de-icing the windshield will preferably be maintained at about 350 degrees Fahrenheit.

The top and bottom rails 12, 13 of the windshield de-icer panel 11 are adapted to be connected to the top and bottom rails of the windshield frame 10 by two pairs of clamps, each of which has a swinging pivoted blade 18 carried by a latch plate 19 mounted on said panel. In use, each latch blade 18 is adapted to detachably engage a strike member 20, two of which strike members are located on the top rail 12 of the windshield frame 10, and two on the lower rail 13 thereof, the specific construction of this clamping mechanism being more fully disclosed in my copending application entitled "Clamping means for windshield de-icer panels," Serial No. 550,475, filed August 21, 1944, patented November 19, 1946, Number 2,411,485.

As clearly shown in Fig. 1, each strike member 20 is secured to the windshield frame 10 by means of a pair of bolts 21. It will thus be seen that the panel 11 is adapted to be clamped securely against the windshield frame 10 without possibility of vibration or leakage of hot air therefrom.

The right-hand vertical rail 22, as clearly shown in Fig. 5, consists of an angle bar which is spaced from the windshield pane 16 so as to furnish an outlet slot 23 for the hot air passing through the panel 11 from left to right, said slot extending the full height of said rail 22.

Hot air for de-icing the windshield is delivered to the left-hand end of the panel 11 through a distributor shell 24, which is preferably wedge-shaped, having a vertical left-hand edge and an inclined right-hand edge which affords the minimum obstruction to the forward vision of the pilot.

The distributor shell 24 is connected on its right-hand edge to the left-hand rail 25, the lower end of which has a curved section 25a which is fastened to the lower panel rail 13 by the screw 25b, previously mentioned. The curved upper end of the shell 24 is likewise secured to the upper rail 12 by a screw 25c.

Provision is also made of a vertical angle-shaped strip 26 which cooperates with the vertical rail 25 to clamp about a U-shaped packing strip 26a which embraces the left-hand end of the transparent pane 17. The rail 25 and the strip 26 are adapted to be secured together by means of locking bolts 27, four of which are shown located on the inclined section of the S-shaped rail 25, and a similar locking bolt 28 is situated on the upper vertical section of said rail 25, as clearly shown in Fig. 4.

The base 29 of the distributor shell 24 is preferably made flat and wedge-shaped, being spaced forwardly from the left-hand angle strip 26 to form an inclined inlet passage 29a which extends the entire length of said shell 24. The flat base 29 of the shell 24 is designed to rest upon a packing strip 30 which in turn rests upon a vertical packing strip 31 placed in contact with the windshield pane 16.

The distributor shell base 29 is also supplied on its left-hand side with an upstanding rearwardly-extending wing 32 which is connected by attaching screws 36, 37, 38 to a vertical side section 35 of said shell. The section 35 is also provided with top and bottom horizontal closed ends 33, 34, as shown in Fig. 4.

Hot air is furnished to the distributor shell 24 through an elbow-shaped inlet pipe 39 having integral double flanges 41, 42 at its forward end for engaging on opposite sides of a circular aperture 43 formed on the upper portion of the distributor shell cover plate 40, as clearly shown in Figs. 1 and 4.

Baffle

In order to guide the hot air through the distributor shell 24, provision is made of an elongated baffle member 44, which is generally U-shaped in cross section, and which serves to divide the stream of hot air from the inlet pipe 39 into three sections as it passes through said distributor shell. The baffle member 44 is provided with a flat base 45 which is secured, as by attaching screws 46, 47, 48, to the distributor shell base 29, previously mentioned.

In order to deflect the air from the inlet pipe 39 smoothly into the distributor shell 24 provision is made of a curved deflector plate 49, as most clearly shown in Fig. 2.

The base 45 of the baffle member 44 has a cut-away lower section 50 having an inclined end 51 which is in alignment with the inclined right-hand edge of the distributor shell 24. The baffle member 44 also has a pair of upstanding long and short inner and outer side wings 52, 53 respectively, which have short reduced upper ends 52a, 53a adapted to fit under the horizontal closed top section 33 of the distributor shell 24. The upper and lower rails 12 and 13 are attached to the distributor shell 24 by screws 53c and 53d, respectively.

The upstanding side wings 52, 53 of the baffle member 44 are provided at their upper sections with a pair of short inwardly-inclined deflecting flanges 54, 55 located in the path of the air flowing forwardly from the inlet pipe 39.

Operation

In operation, it will be seen that the hot air in passing through the distributor shell 24 will be divided into three streams. Thus, at the top third of the panel 11 it will flow directly into said panel as indicated by the horizontal arrows 56, 59. At the middle section of the panel 11, the air will pass in a right-angular path indicated by the arrows 57, 60, while at the bottom or lower third of said panel the air will pass in a right-angular path as shown by the arrows 58, 61. By thus passing the air into the panel in three parallel streams it will be clear that the de-icing conditions will be maintained extremely uniform and the maximum of clear vision will thereby be assured.

While there has been disclosed in this specification one form in which the invention may be embodied, it is to be understood that this form is shown for the purpose of illustration only, and that the invention is not to be limited to the specific disclosure, but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In a windshield de-icer, a substantially rectangular panel for attachment to the rear of a windshield frame, said panel comprising a central transparent pane mounted in a pair of longitudinal rails and a pair of end rails, means secured to said longitudinal rails for clamping said panel upon said windshield frame, portions of said end rails being open to form inlet and outlet slots for the passage of the hot air for de-icing the windshield, an air supply distributor shell connected to said inlet slot, and a baffle member having parallel wings of different lengths in said shell to cause hot air supplied to said shell to pass into said panel at a plurality of parallel areas so as to maintain uniform de-icing conditions in said panel, said baffle member being parallel to said inlet end rail and having the outer wing member shorter than the inner wing thereof.

2. A windshield de-icer as defined in claim 1, in which said baffle is provided at its upper portion with a base having secured thereto a downwardly extending deflector member having a curved upper extremity located in the path of the air supplied to said distributor shell to deflect said air downwardly through said baffle to the lower part of said shell.

3. A windshield de-icer as defined in claim 1, in which said distributor shell is located at one end of said panel and has its inner lower edge inclined outwardly to provide the minimum of obstruction to the pilot's vision.

4. In a baffle for a de-icer distributor shell attached to the side of a windshield panel, a flat base adapted to be secured to the forward base of said shell, a pair of parallel side wings extending rearwardly from said base, one of said side wings having an open recess whereby the air supplied to said shell from the rear thereof will be divided and caused to flow into said panel at a plurality of spaced sections, the rear edges of said side wings being inclined inwardly at the top portion of said baffle to deflect the air supplied to the rear of said shell in such a manner as to cause the hot air to flow into said shell in three streams of substantially equal volume.

5. In a windshield de-icer panel, an air supply distributor shell located along one edge of said panel, said shell having a narrow vertical baffle located in the central portion thereof, said baffle having a pair of rearwardly-extending parallel side wings of unequal length, means to supply a stream of air to the rear of said shell against the edges of said baffle, the wings of said baffle being adapted to divide said air stream into three separate portions before it is directed laterally by said shell into said panel, the outer wing of said baffle being shorter than the inner wing thereof.

JOHN HAROLD WEBSTER.

REFERENCES CITED

The following references are of record in the file of this patent:

UNITED STATES PATENTS

| Number | Name | Date |
|---|---|---|
| 1,638,505 | Nash | Aug. 9, 1927 |
| 1,790,419 | Heinemenn | Jan. 27, 1931 |
| 1,882,337 | Neill | Oct. 11, 1932 |
| 2,044,488 | Wendt | June 16, 1936 |
| 2,096,901 | Knecht | Oct. 26, 1937 |
| 2,146,692 | Tiedman | Feb. 7, 1939 |